Patented Dec. 24, 1946

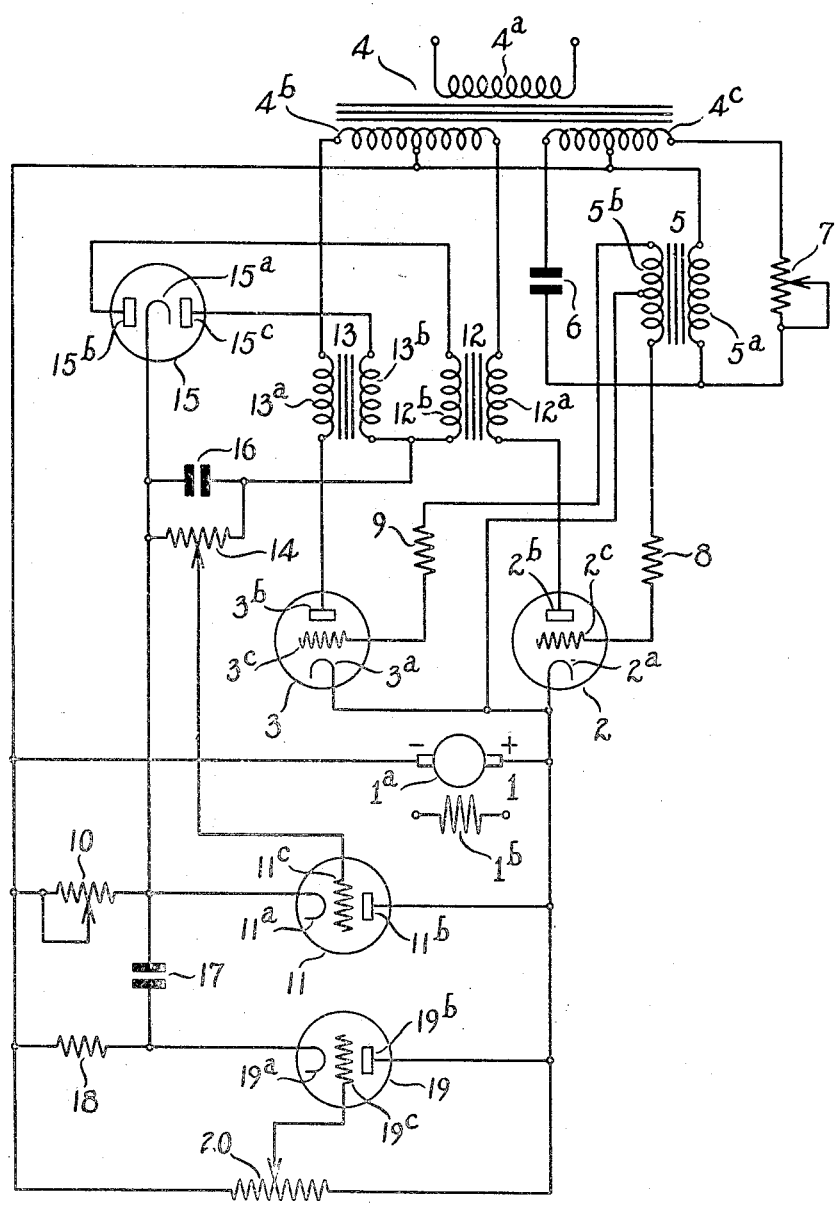

2,413,070

UNITED STATES PATENT OFFICE 2,413,070

ELECTRONIC MOTOR CONTROL

James B. Reeves, Whitefish Bay, Wis., assignor to Cutler-Hammer, Inc., Milwaukee, Wis., a corporation of Delaware Application July 12, 1944, Serial No. 544,541

5 Claims. (Cl. 172—239)

1

The invention relates to speed control of electric motors, and while not limited thereto it is particularly applicable to control of speed of direct current motors supplied with unidirectional current from an alternating current source through unilaterally conducting rectifiers.

An object of the present invention is to provide automatic means for limiting the speed of a motor which is supplied as aforestated, which is applicable to motors subjected to widely varying mechanical loads, thus overcoming what has been a serious disadvantage of that type of supply.

Another object is to provide such speed limiting means which will afford dynamic braking in the case of an overhauling load.

Another object is to provide electronic means for automatically connecting a load circuit to a dynamo electric machine when the current drawn by the machine falls below a critical value.

Another object is to provide a dynamo-electric machine with automatic means for connecting a dynamic load to said machine under certain abnormal conditions of operation and disconnecting said load when the conditions return to normal.

Other objects and advantages will hereinafter appear.

The accompanying drawing is a diagrammatic representation of a system incorporating the invention. The drawing illustrates a direct current motor 1, having an armature $1^a$, and a field winding $1^b$. The field winding $1^b$, may be supplied with energizing current from any suitable source, and the current in this winding may be controlled in any suitable manner. The armature $1^a$ is supplied with current through a pair of electron tubes 2 nd 3, from the center tapped secondary winding $4^b$ of an alternating current transformer 4, which also has a primary winding $4^a$ and a center tapped secondary winding $4^c$. The electron tubes 2 and 3 are of the gaseous conduction type and have cathodes $2^a$ and $3^a$, respectively, anodes $2^b$ and $3^b$, respectively, and control electrodes $2^c$ and $3^c$, respectively. The cathodes may be of the thermal emission type, in which case they may be heated in any desired manner. If the system is to function on failure of main current supply, the heating energy may be supplied by a separate source. The cathodes $2^a$ and $3^a$ are jointly connected to the positive pole of the armature $1^a$, while each of the anodes $2^b$ and $3^b$ is connected to one of the end terminals of the transformer winding $4^b$. The center tap of the winding $4^b$ is connected to the negative

2 terminal of the armature $1^a$ and is also connected to the center tap of the secondary winding $4^c$.

The current normally supplied to the armature $1^a$ is controlled by controlling the moment of rendering the tubes 2 and 3 conducting during their respective positive half cycle. For this purpose the primary winding $5^a$ of a transformer 5, which also has a secondary winding $5^b$ is connected between the center tap of the winding $4^c$ and the common terminal of a condenser 6, and a variable resistor 7, the condenser 6 and the resistor 7 being connected in series with each other across the terminals of the winding $4^c$. By changing the value of the resistor 7 the phase relation between the voltage of winding $5^a$, and the voltage of the winding $4^c$ may be changed. Change of the phase relation of the voltage in winding $5^a$ will also change the phase relation of the voltage induced in the winding $5^b$ with respect to the voltage of the winding $4^b$, that is the voltage impressed upon the main electrodes of the tubes 2 and 3. The center tap of the winding $5^b$ is connected to the cathodes $2^a$ and $3^a$, while the end terminals of said winding $5^b$ are connected in series with resistors 8 and 9, respectively, to the grids $2^c$ and $3^c$, respectively. Thus by modifying the resistor 7 the phase of the potential impressed between the cathodes $2^a$ and $3^a$, and the corresponding grids $2^c$ and $3^c$, may be varied to cause the tubes 2 and 3 to conduct current during variable fractions of the positive half cycle of the voltage impressed on said tubes.

In some cases the load on the motor fluctuates very rapidly between wide limits and it may even be negative, as is the case on hoisting apparatus where the load tends to drive the motor armature. Such an over-hauling load is particularly objectionable in a system of the type illustrated where the motor armature is supplied with current through unilateral conducting devices, as no reverse or regenerative current can flow through these devices to limit the speed of the motor, so that the load may acceelrate the motor armature to an excessive speed. By connecting a resistance across the armature, a regenerative current is caused to flow through this resistance to prevent excessive increase of the armature speed.

The present system provides for automatically inserting an adjustable dynamic braking resistance 10, which is connected in series with an electron tube 11, across the terminals of the armature $1^a$. The electron tube 11 may be of the gaseous conduction type and is provided with a cathode $11^a$, a anode $11^b$, connected to the positive terminal of the armature $1^a$, and a control grid 11c. The tube 11 is controlled by control of the potential of the grid 11c with respect to the cathode 11a, in such a manner that the tube is conducting whenever the current through the tubes 2 and 3, due to the reduction in load thereof, approaches zero. To provide a voltage for control of the grid 11c, the primary winding 12a of a current transformer, having a secondary winding 12b, is connected between the anode 2b, and the corresponding outer end tap of the winding 4b, and the primary winding 13a, of a current transformer 13, is similarly connected between the anode 3b and the corresponding end tap of the winding 4b. One of the end terminals of each of the windings 12b and 13b is connected to a variable resistor 14, the other terminal of said resistor is connected to the cathode 15a, of a full wave rectifier 15, which is also provided with two anodes 15b and 15c. The anode 15b is connected to the second terminal of the winding 12b, while the anode 15c is connected to the second terminal of the winding 13b. The cathode 15a is also connected to the cathode 11a. A smoothing condenser 16 is connected in parallel with the resistor 14, and the movable contact of said resistor is connected to the grid 11c of tube 11.

As long as current flows through the rectifier tubes 2 and 3, respectively, voltage is induced during succeeding half cycles in the windings 12b and 13b, respectively. These voltages are impressed through the rectifier 15 between the cathode 11a and the grid 11c, the polarity being such that any voltage impressed upon the grid 11c, renders the tube 11 nonconducting so that the resistor 10 has no effect upon the operation of the motor armature 1a. However, if the current should decrease to a low value or cease entirely, through the tubes 2 and 3 because the motor armature due to an overhauling load produces a counterelectromotive force which is substantially equal or higher than that impressed upon it by the winding 4b, no low voltage is induced in the windings 12b and 13b. This eliminates or reduces the blocking potential impressed upon the grid 11c and the tube 11 becomes conducting, thereby connecting the resistor 10 across the armature 1a to permit the passage of a dynamic braking current which will slow down the armature 1a and which may also render the tubes 2 and 3 again conducting. When the tubes are again carrying a sufficient current the latter produces again a blocking potential on the grid 11c, which renders the tube 11 nonconducting.

The system is arranged in such a manner that it may be adjusted so that the tube 11 becomes conducting when the armature still receives a relatively small current through the tubes 2 and 3, that is, before the load becomes negative. This is accomplished by means of the adjustable resistor 14. By adjusting the movable contact of said resistor the voltage which is impressed upon the grid 11c, may be adjusted to any desired fractional equivalent of the total voltage induced in the windings 12b and 13b, so that when this latter voltage becomes relatively small the potential impressed upon the grid 11c is insufficient to block conduction of the tube 11, thereby connecting the resistor 10 across the armature 1a as explained heretofore.

It will be obvious that the tube 11 may be a high vacuum tube, but preferably it is of the gaseous conduction type which after it has started to become conducting will continue to conduct until the voltage impressed upon its main electrodes is reduced substantially to zero. In order to render the tube 11 nonconducting after it has started to conduct, the system is provided with an oscillating circuit which periodically lowers the potential between the cathode 11a and the anode 11b, when the tube is conducting. The oscillating circuit comprises a condenser 17 and a resistor 18 connected in series with each other across the terminals of the resistor 10. Connected to the common terminal of the condenser 17 and the resistor 18 is the cathode 19a of an electron tube 19, which also has an anode 19b and a control grid 19c. There is further connected across the terminals of the armature 1a, a voltage dividing resistor 20, the movable contact of which is connected to the grid 19c. When current flows through the resistor 10 it produces a voltage drop at the terminals thereof which causes the condenser 17 to be charged, so that its terminal connected to the cathode 19a becomes increasingly negative, which in turn renders the control grid 19c increasingly positive with respect to the cathode 19a, until the potential of the grid 19c is sufficiently high with respect to that of the cathode 19a to cause conduction of the tube 19. When the tube 19 becomes conducting it causes a rise of potential of the cathode 19a due to the relatively high impedance of the resistor 18. This causes a sudden rise of the potential of the condenser 17 and a corresponding rise of the potential of the cathode 11a, so that insufficient potential is available between the cathode 11a and the anode 11b to maintain its current and the tube 11 stops conducting. When the tube 11 stops conducting, the condenser 17 discharges through resistors 10 and 18 and as soon as the condenser 17 has been discharged, the potential of the cathode 11a rises again to substantially that of the negative terminal of the armature 1a. If at that time the blocking potential of the grid 11c is still relatively low the tube 11 will again become conducting. It will be obvious that at the moment when the tube 11 becomes conducting it causes the cathode 19a to become substantially more positive with respect to the control electrode 19c, so that the tube 19 is again rendered nonconducting. Thus the two tubes 11 and 19 will alternately conduct current and the tube 11 will intermittently connect the dynamic braking resistor 10 across the armature 1a of the motor, until the current drawn by the motor from the transformer winding 4b through the tubes 2 and 3 is sufficiently large to produce a blocking potential at the grid 11c which will prevent further initiation of discharge through the tube 11. The frequency of operation of the tube 19 to interrupt current flow of tube 11 may be regulated by adjustment of the potential of grid 19c through adjustment of the voltage divider 20.

I claim:

1. In a dynamic braking system, the combination with an alternating current source, a direct current dynamo electric machine having an energizing winding, and a unilaterally conducting device connected between said source and said winding to conduct current from the former to the latter, of an impedance and an electron tube having a control electrode connected in series with each other in a circuit paralleling said winding, a transformer having a primary winding connected in circuit with said device and said source, and also having a secondary winding, a rectifier connected between said secondary transformer winding and said control electrode to impress upon said control electrode a unidirectional voltage resulting from the potential induced in said transformer secondary winding by the current in said transformer primary winding, to render said tube conducting upon decrease of said current below a critical value.

2. In a dynamic braking system, the combination with an alternating current source, a direct current dynamo electric machine having an energizing winding, and a unilaterally conducting device connected between said source and said winding to conduct current from the former to the latter, of an impedance and an electron tube having a control electrode connected in series with each other in a circuit paralleling said winding, a current transformer having a primary winding connected in series circuit with said device and said source, and also having a secondary winding, a rectifier connected between said secondary transformer winding and said control electrode to impress upon said control electrode a unidirectional voltage resulting from the potential induced in said secondary transformer winding by the current in said primary transformer winding, to render said tube alternatively conducting and nonconducting according to the direction of departure of said current from a critical value.

3. In a dynamic braking system, the combination with an alternating current source, a direct current dynamo-electric machine having an energizing winding and a unilaterally conducting device connected between said source and said energizing winding to conduct current from the former to the latter, of an impedance and a first gaseous tube having a control electrode connected in series with each other in a circuit paralleling said energizing winding, a current transformer having a primary winding connected in series circuit with said device and said source, and also having a secondary winding, a rectifier connected between said secondary transformer winding and said control electrode to impress upon said control electrode a unidirectional voltage resulting from potential induced in said secondary transformer winding by the current in said primary transformer winding, to render said tube alternatively conducting and nonconducting according to the direction of departure of said current from a critical value, a second resistor and a second gaseous tube connected in series with each other and in parallel with said energizing winding, a condenser connected between the junction of said resistor and said first gaseous tube and the junction of said second resistor and said second gaseous tube, and means to impress a variable biasing voltage upon the control electrode of said second tube to initiate current flow in said second tube in response to the flow of current in said first resistor and as a consequence interrupt current flow in said first tube in response to the flow of current in said second resistor.

4. In a dynamic braking system, the combination with an alternating current source, a direct current dynamo-electric machine having an energizing winding and a unilaterally conducting device connected between said source and said energizing winding to conduct current from the former to the latter, of an impedance and a first gaseous tube having a control electrode connected in series with each other in a circuit paralleling said energizing winding, a current transformer having a primary winding connected in series circuit with said device and said source, and also having a secondary winding, a rectifier connected between said secondary transformer winding and said control electrode to impress upon said control electrode a unidirectional voltage resulting from the potential induced in said secondary transformer winding by the current in said primary transformer winding, to render said tube alternatively conducting and nonconducting according to the direction of departure of said current from a critical value, a second resistor and a second gaseous tube connected in series with each other and in parallel with said energizing winding, a condenser connected between the junction of said resistor and said first gaseous tube and the junction of said second resistor and said second gaseous tube, a voltage divider connected in parallel with said winding, and a connection between the movable contact of said voltage divider and a control electrode of said second tube to initiate current flow in said second tube in response to the flow of current in said first resistor and as a consequence interrupt current flow in said first tube in response to the flow of current in said second resistor.

5. In a dynamic braking system, the combination with an alternating current source, a translating circuit and a plurality of unilaterally conducting devices connected between said source and said circuit to conduct consecutive half-waves of current from the former to the latter, of an impedance and an electron tube having a control electrode connected in series with each other and in circuit paralleling said translating circuit, and means responsive to the magnitude of the alternating current supplied to said devices to impress an adjustable potential upon said control electrode to render said tube alternatively conducting and nonconducting according to the direction of departure of said current from a critical value.

JAMES B. REEVES.